(12) United States Patent
Barker et al.

(10) Patent No.: US 8,252,115 B2
(45) Date of Patent: Aug. 28, 2012

(54) SYSTEM AND METHOD FOR GROWING NANOTUBES WITH A SPECIFIED ISOTOPE COMPOSITION VIA ION IMPLANTATION USING A CATALYTIC TRANSMEMBRANE

(75) Inventors: Delmar L. Barker, Sweetwater Tucson, AZ (US); John Warren Beck, Condesa Tucson, AZ (US)

(73) Assignees: Raytheon Company, Waltham, MA (US); The Arizona Board of Regents on behalf of The University of Arizona, Tucson, AZ (US)

( * ) Notice: Subject to any disclaimer, the term of this patent is extended or adjusted under 35 U.S.C. 154(b) by 1087 days.

(21) Appl. No.: 12/139,685

(22) Filed: Jun. 16, 2008

(65) Prior Publication Data

US 2009/0252887 A1     Oct. 8, 2009

Related U.S. Application Data

(63) Continuation-in-part of application No. 12/061,317, filed on Apr. 2, 2008, now Pat. No. 7,883,580.

(51) Int. Cl.
*C23C 16/00* (2006.01)
*C23C 16/448* (2006.01)
*C23C 16/452* (2006.01)
*C23C 16/455* (2006.01)
*C23C 16/52* (2006.01)

(52) U.S. Cl. .................................. 118/715; 118/723 FI

(58) Field of Classification Search .................. 118/715, 118/723 FI, 723 FE
See application file for complete search history.

(56) References Cited

U.S. PATENT DOCUMENTS

| 7,235,796 | B2 * | 6/2007 | Kolodney et al. | 250/492.21 |
| 7,465,921 | B1 * | 12/2008 | Joyce et al. | 250/288 |
| 7,507,960 | B2 * | 3/2009 | Zani et al. | 250/306 |
| 7,557,360 | B2 * | 7/2009 | Ward et al. | 250/423 F |
| 7,736,616 | B2 | 6/2010 | Lusk et al. | |
| 7,833,355 | B2 * | 11/2010 | Capizzo | 118/729 |
| 7,883,580 | B2 * | 2/2011 | Barker et al. | 118/715 |
| 2004/0101685 | A1 | 5/2004 | Fan et al. | |
| 2005/0191417 | A1 | 9/2005 | Fan et al. | |
| 2005/0276742 | A1 | 12/2005 | Fan et al. | |

(Continued)

FOREIGN PATENT DOCUMENTS

CN         1696057 A       11/2005

OTHER PUBLICATIONS

Daenen et al., The wonderous world of carbon nanotubes, Eindhoven University of Technology, Feb. 27, 2003, pp. 1-23.

(Continued)

*Primary Examiner* — Jeffrie R Lund
(74) *Attorney, Agent, or Firm* — Eric A. Gifford

(57) ABSTRACT

An ion source(s) is configured to generate ions from one or more elements including a plurality of different isotopes or unique molecular combinations of two or more different isotopes from at least one of the selected elements. A selection filter(s) directs a subset of the ions onto a catalytic transmembrane to grow nanotubes of a specific isotope composition on the opposite side of the transmembrane. The nanotubes may be uniformly or selectively doped with dopant atoms. A controller can configure the selection filter(s) to sequentially pass different subsets of ions to form isotope, molecular or element junctions in the growing nanotubes.

29 Claims, 12 Drawing Sheets

U.S. PATENT DOCUMENTS

| | | | |
|---|---|---|---|
| 2006/0076489 A1* | 4/2006 | Ohshima et al. | 250/310 |
| 2006/0257566 A1 | 11/2006 | Fan et al. | |
| 2008/0026168 A1 | 1/2008 | Fan et al. | |
| 2008/0206463 A1 | 8/2008 | Grigorian et al. | |
| 2008/0223795 A1 | 9/2008 | Bakajin et al. | |
| 2009/0252886 A1* | 10/2009 | Barker et al. | 427/523 |
| 2009/0252887 A1* | 10/2009 | Barker et al. | 427/523 |
| 2010/0284898 A1 | 11/2010 | Ziegler et al. | |
| 2011/0031104 A1* | 2/2011 | Barker et al. | 204/157.2 |

OTHER PUBLICATIONS

Striemer et al., Charge- and size-based separation of macromolecules using ultrathin silicon memranes, 2007 Nature Publishing Group, pp. 749-753.

Wang et al., Catalytic synthesis of carbon nanotubes under ion irradiation, Letters to the Editors, Carbon 43 (2005) 447-450.

Babonneau et al., Morphology of encapsulated iron nanoparticles obtained by co-sputtering and implantation: a GISAXS study, J. Appl. Cryst. (2000) 33, 437-441.

Adhikari et al., Ion-implantation-prepared catalyst nanoparticles for growth of carbon nanotubes, Applied Physics Letters 86, 053104 (2005), pp. 86-88.

Kotakoski et al., B and N implantation into carbon nanotubes: Insight from atomistic simulations, Physical Review B 71, (2005), 205408-1-205408-6.

Rodriguez-Manzo et al., In situ nucleation of carbon nanotubes by the injection of carbon atoms into metal particles, Nature nanotechnology, vol. 2, (May 2007)307-311.

P.M. Ajayan, Nanotubes from carbon, 1999 American Chemical Society, May 1, 1999, pp. 1787-1799.

Yamamoto et al., New method of carbon nanotube growth by ion beam irradiation, American Institute of Physics, (1996), 4174-4175.

Kaukonen et al., Atomic-scale modeling of the ion-beam-induced growth of amorphous carbon, the American Physical Society (2000), 2806-2811.

Tanemura et al., Synthesis of carbon nanotubes using hydrocarbon ion beams, Advanced Materials Research, vols. 11-12 (2006), 547.

Tanemura et al., Direct growth of single carbon nanofiber onto tip of scanning probe microscopy induced by ion irradiation, Japanese J. of Appl.Phys, vol. 45, No. 3, 2004-2008.

Shiomi et al., "Heat conduction of single-walled carbon nanotube isotope superlattice structures: A molecular dynamics study" Physical Review B 74, 155401 (2006).

Yang et al., "Ultralow thermal conductivity of isotope-doped silicon nanowires" Nano Letters 2008 vol. 8, No. 1 276-280.

Hofmann et al., "Ledge-flow-controlled catalyst interface dynamics during Si nanowire growth", Nature Materials, vol. 7, May 2008 pp. 372-375.

Shiomi et al, "Heat conduction of single-walled carbon nanotube isotope superlattice structures: a molecular dynamics study," Phys. Rev. vol. 74, No. 15, Oct. 3, 2006, pp. 155401-155407.

Sha et al., "Silicon nanotubes," Advanced Materials, vol. 14, No. 17, Aug. 29, 2002, pp. 1219-1221.

Fan et al, "Monitoring the growth of carbon nanotubes by carbon isotope labelling," Nanotechnology, IOP, Bristol, GB, vol. 14, No. 10, Oct. 1, 2003, pp. 1118-1123.

Seifert et al., "Tubular structures of silicon," Phys. Rev. B., vol. 63, Apr. 21, 2001, pp. 193409-193413.

Perepichka et al., "Silicon nanotubes," SMALL, vol. 2, No. 1, Nov. 4, 2005, pp. 22-25.

U. Bangert et al., Doping of few-layered graphene and carbon nanotubes using ion implantation, Physical Review B 81, 2010, The American Physical Society, pp, 245423-1 through 245423-11.

\* cited by examiner

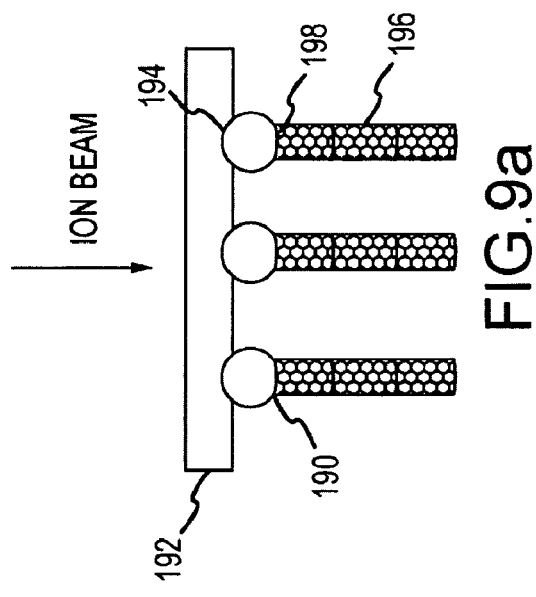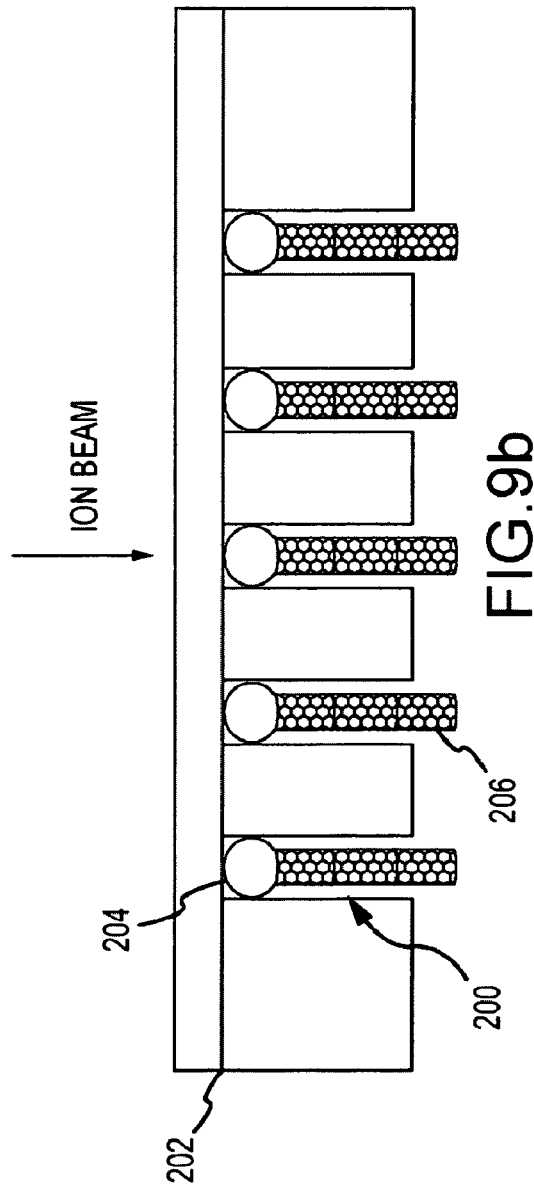

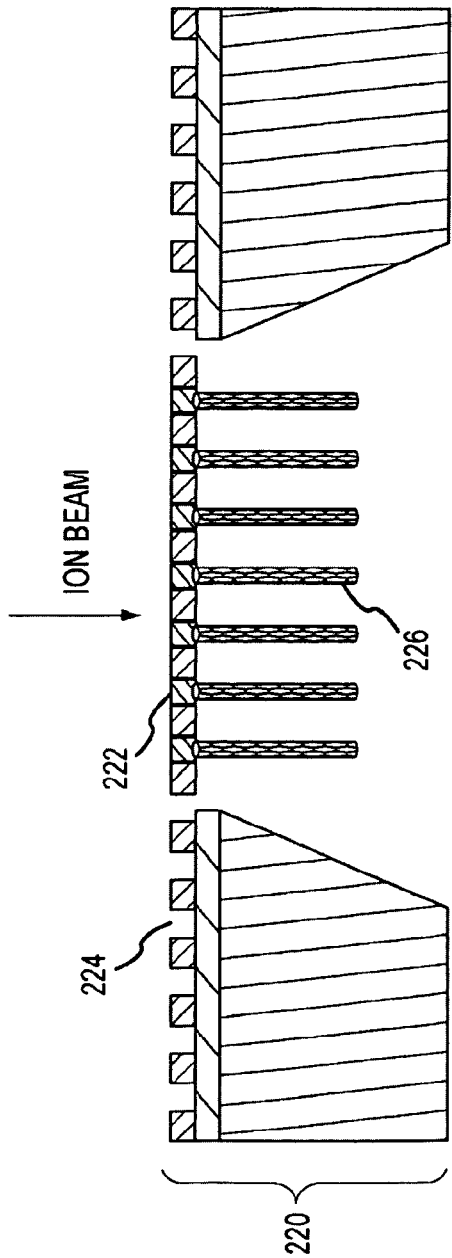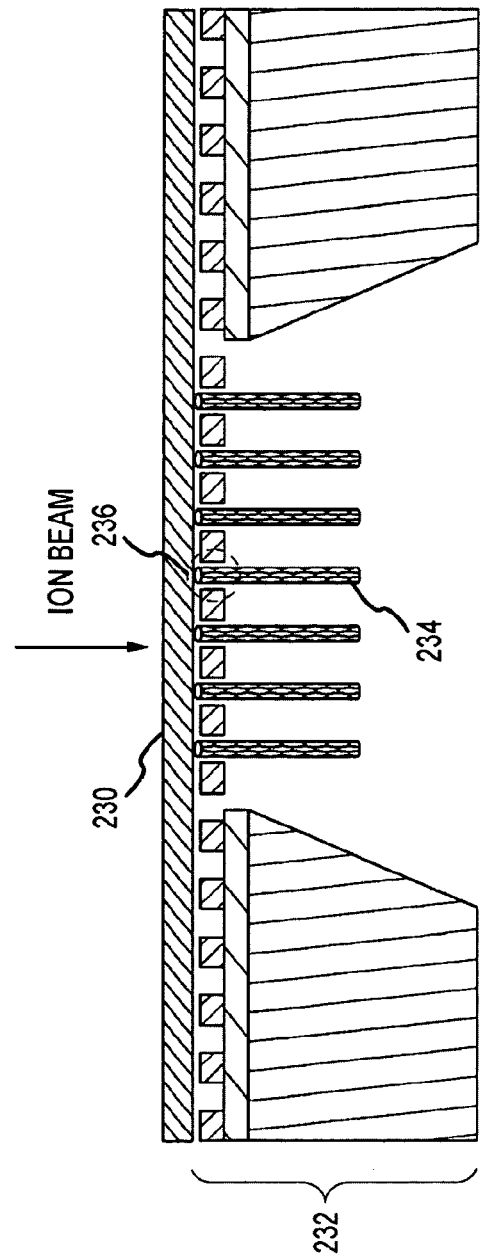

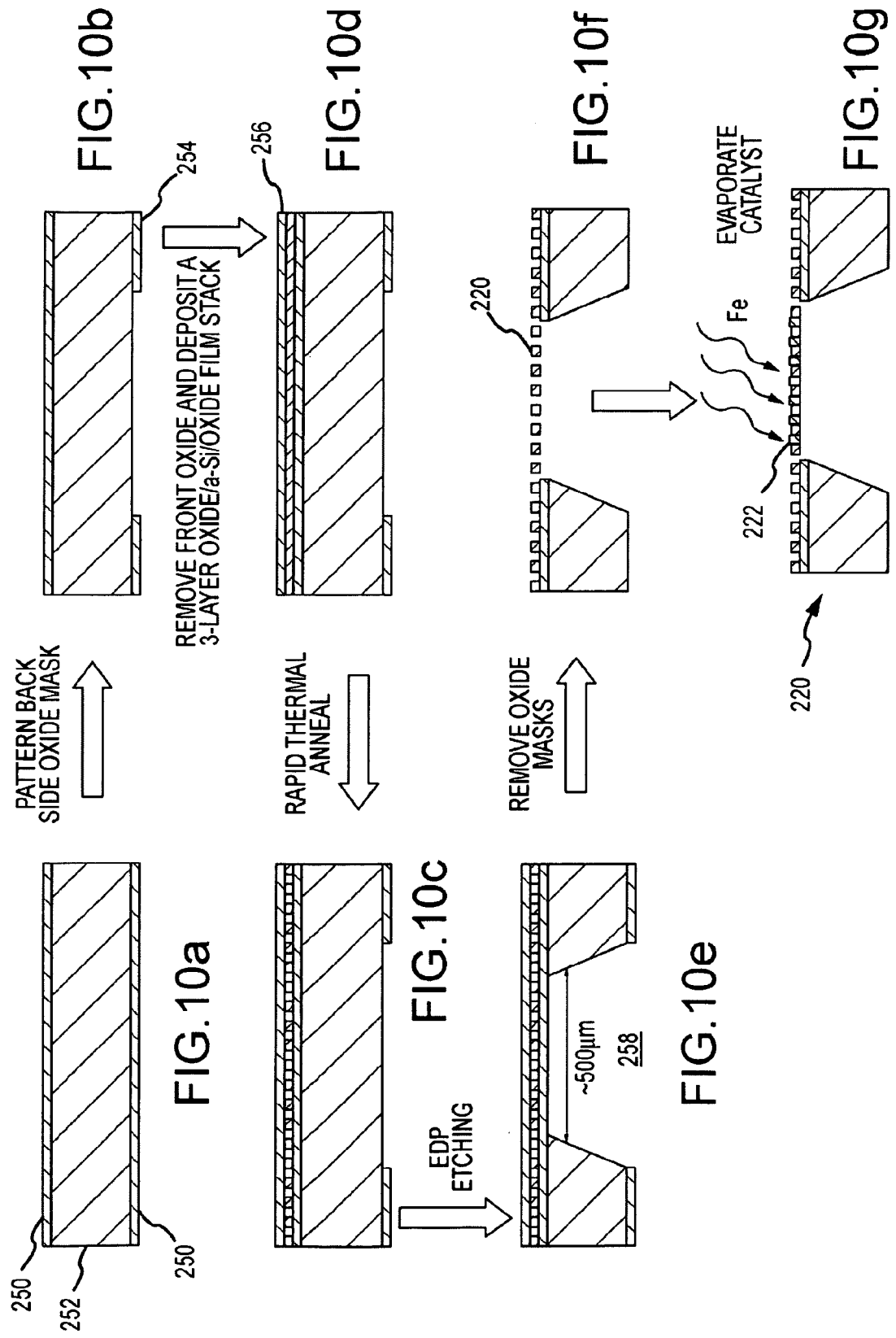

SYSTEM AND METHOD FOR GROWING NANOTUBES WITH A SPECIFIED ISOTOPE COMPOSITION VIA ION IMPLANTATION USING A CATALYTIC TRANSMEMBRANE

CROSS-REFERENCE TO RELATED APPLICATIONS

This application claims benefit of priority under 35 U.S.C. 120 as a continuation-in-part of U.S. application Ser. No. 12/061,317 entitled "System and Method for Nanotube Growth via Ion Implantation using a Catalytic Transmembrane" filed on Apr. 2, 2008, now U.S. Pat. No. 7,883,580 the entire contents of which are incorporated by reference.

BACKGROUND OF THE INVENTION

1. Field of the Invention

This invention relates to nanotube (NT) growth of carbon and other materials using an ion implantation process, and more particular to the growth of nanotubes with a specified isotope composition using a selection filter and catalytic transmembrane.

2. Description of the Related Art

Carbon nanotubes (CNTs) have stimulated a great deal of interest in the microelectronic and other industries because of their unique properties including tensile strengths above 35 GPa, elastic modulus reaching 1 TPa, higher thermal conductivity than diamond, ability to carry 1000× the current of copper, densities below 1.3 g/cm$^3$ and high chemical, thermal and radiation stability. CNTs have great promise for devices such as field effect transistors, field emission displays, single electron transistors in the microelectronic industry, and uses in other industries. Commercialization of CNTs will depend in large part on the ability to grow and network CNTs on a large cost-effective scale without compromising these properties.

As illustrated in FIG. 1, a CNT 10 is a hollow cylindrical shaped carbon molecule. The cylinderical structure is built from a hexagonal lattice of sp$^2$ bonded carbon atoms 12 with no dangling bonds. The properties of single-walled nanotubes (SWNTs) are determined by the graphene structure in which the carbon atoms are arranged to form the cylinder. Multi-walled nanotubes (MWNTs) are made of concentric cylinders around a common central hollow.

CNTs are commonly grown using several techniques such as arc discharge, laser ablation and chemical vapour deposition (CVD). In CVD the growth of a CNT is determined by the presence of a catalyst, usually a transition metal such as Fe. Co or Ni, which causes the catalytic dehydrogenation of hydrocarbons and consequently the formation of a CNT. CVD generally produces MWNTs or SWNTs of relatively poor quality due mostly to the poorly controlled diameters of the nanotubes. However, CVD is relatively easy to scale up and can be integrated with conventional microelectronic fabrication, which favors commercialization.

The way in which nanotubes are formed at the atomic scale is not precisely known. The growth mechanism is still a subject of scientific debate, and more than one mechanism might be operative during the formation of CNTs. As shown in FIGS. 2a and 2b, a catalyst 20 is deposited on a support such as silicon, zeolite, quartz, or inconel 22. At elevated temperatures, exposure to a carbon containing gas causes the catalyst to take in carbon, on either the surfaces, into the bulk, or both. This thermal diffusion process of neutral carbon atoms occurs at energies of a few electronvolts (eV). A precursor to the formation of nanotubes and fullerenes, $C_2$, is formed on the surface of the catalyst. From this precursor, a rodlike carbon 24 is formed rapidly, followed by a slow graphitization of its wall. The CNT can form either by 'extrusion' (also know as 'base growth' or 'root growth') shown in FIG. 2a, in which the CNT grows upwards from the catalyst that remains attached to the support, or the particles can detach from the substrate and move at the head of the growing nanotube, labelled 'tip-growth', as shown in FIG. 2b. Depending on the size of the catalyst particle either SWNT or MWNT are grown. A typical catalyst may contain an alloy of Fe, Co or Ni atoms having a total diameter of 1 to 100 nm (on the order of 1,000 atoms for 1 nm diameter of catalyst).

As shown in FIG. 3, to synthesize CNTs 24 using CVD the support 22 and catalytic material 20 are placed inside an environmentally-controlled chamber 32. The sample is heated until the temperature is great enough (400° C.) that the introduction of hydrogen along with a buffer gas (Argon) "reduces" (removes the oxide) the particle. A plurality of gas feeds 34 introduce a process gas including a mixture of a carbon-containing growth gas 36, typically a hydrocarbon $C_xH_y$ such as Ethylene ($C_2H_4$), Methane ($CH_4$), Ethanol ($C_2H_5OH$), or Acetylene ($C_2H_2$) or possibly a non-hydrocarbon such as carbon-monoxide (CO), an inert buffer gas 38 such Argon (Ar) to control pressure inside the chamber and prevent released hydrogen atoms from exploding and possibly a scrubber gas 40 such as $H_2O$ or $O_2$ to periodically or continuously clean the surface of the catalyst. An energy source 42 such as a heating coil provides the energy necessary (e.g. a few eV) to heat the catalyst to a temperature which allows it to 'crack' the hydrocarbon molecules into reactive atomic carbon 44. The reactive carbon 44 is absorbed into the surface of catalytic material 20 causing the CNT to grow from the same catalytic surface. A pump system 46 including a vacuum and/or pressure pump controls the pressure inside the chamber to produce conditions both conducive to absorption of carbon atoms into the catalytic material and growth of CNTs from the catalytic material. A number of electrical ports 48 are provided to accommodate pressure sensors, thermocouples and the like to monitor conditions inside the chamber.

Naturally occurring carbon includes approximately 99% C12, 1% C13 and ≈0% C14 isotopes. Alternately, carbon can be manufactured to include most any specified isotope composition e.g. 50% C12 and 50% C13. However, current technologies cannot manufacture a high-purity single pure isotope of carbon e.g. ~100% C12. "Pure" in this document means greater than 99.9% purity. The conventional CVD process grows nanotubes that reflect the composition of isotopes in the carbon material that provides the process gas.

Researchers have investigated the possibility and desirability of forming CNTs from a pure isotope and forming isotope junctions in the nanotube for spintronic (spin electronic) applications. Shiomi et al. "Heat conduction of single-walled carbon nanotube isotope superlattice structures: A molecular dynamics study" Physical Review B 74, 155401 (2006) investigates the heat conduction properties a SWNT super lattice (see FIG. 1) having alternating lengths of C12 and C13 using classical molecular dynamics simulations. Investigations such as Shiomi's "assume" the existence of a CNT having the desired isotope junctions and purity but have not proposed a good solution for growing CNTs of a pure isotope much less CNTs having isotope junctions.

SUMMARY OF THE INVENTION

The present invention provides a system and method of ion implantation for growing nanotubes of one or more elements selected from Carbon, Nitrogen, Boron, Titanium, Silicon, Germanium, Aluminum and Gallium with a specified isotope composition. A catalytic transmembrane separates a vacuum chamber into implantation and growth regions. The transmembrane includes one or more catalysts supported on a membrane with each catalyst having a first portion of catalyst surface facing the implantation region and an opposing second portion of catalyst surface directly exposed to the growth region. An ion source (or sources) generate ions including a plurality of different isotopes or unique molecular combinations of two or more different isotopes from one or more elements. A selection filter (or filters) directs a subset (less than all) of those ions towards the membrane resulting in ion implantation through the first portion of catalyst surface into, and growth from the opposing second portion of catalyst surface of nanotubes composed of at least one isotope in the subset. The membrane and catalysts effectively shield the growing nanotubes from the ion beam. A controller may reconfigure the selection filter to direct a different subset of ions for the same or different selected element towards the membrane to alter the isotope composition of the nanotubes as they grow. This approach provides the means to grow nanotubes having a specified isotope composition from one or more elements doped or undoped at very high purity levels with spatial definition to realize nanotube structures that researches have only simulated and structures and devises not yet envisioned.

The filter may be configured to pass ions of a single isotope such as 12C atoms or a unique molecular combination of different isotopes such as 26Al14N to grow a pure nanotube from that atom or molecule. The filter could be reconfigured to pass a different single isotope or molecule such as 13C or 26Al15N to form isotope-junctions 12C-13C and molecular-junctions 26Al14N-26Al15N, respectively. The source(s) and filter could be configured to switch between specific isotopes of different elements. e.g. 12C-10B10B14N to form element-junctions. These structures can be doped with dopant atoms using different means. The source may include a small amount of dopant material that looks like the desired isotope to the filter and thus is included as part of the subset directed towards the catalysts. For example, a small amount of 11B1H could be included with a carbon source. If the filter is configured to pass ions having a mass number of twelve, 12C and 11B1H will be directed towards the substrate. Upon implantation in the catalyst, the H atom will break away leaving 11B dopant atoms in the 12C lattice. This is an effective approach for achieving uniform doping. Alternately, a separate source of dopant ions may be provided and directed through the same filter. By controlling the source, the dopant concentration can be varied or turned on and off entirely to selectively dope the nanotube. A separate source of dopant ions and separate selection filter can be used to dope the nanotube lattice with dopant atoms that do not look like the selected isotopes. If isotope selection of the dopant ions is not required, the dopant source can be directed at the substrate without filtering.

The ion source(s) and selection filter(s) can be configured in many different ways depending on the nanotube structure to be grown. The technology employed to separate the primary ion beam into a plurality of secondary ion beams one for each of the different isotopes or unique molecular combinations may use a magnetic field, a combination magnetic and electric fields or some other approach that is effective to discriminate among the different isotopes and molecules. In an exemplary embodiment, a current is passed through an electromagnet to establish a magnetic field that separates the primary beam into secondary beams based on the momentum of the ions. Assuming that the ions have the same energy, the filter separates the ions based on their charge-to-mass (Q/M) ratio. Further assuming that the bulk of the ions have the same charge, the filter becomes a mass selection filter. The desired subset of mass numbers (secondary beam(s)) directed through a slit towards the membrane can be selected by varying the magnetic field and/or varying the energy of the ions during passage through the electromagnet. Typically, the filter will direct only a single mass number (secondary beam) towards the substrate although the filter could be configured to pass a larger subset. The single mass number may encompass one or more different isotopes or molecules. Taking a simple example, the filter can be configured to pass ions with a mass number of twelve. Given a carbon source that generates 12C, 13C and possibly 14C isotopes, the 12C isotopes will be directed to the membrane while blocking or redirecting the 13C and 14C ions. If the source includes 11B1H molecules they will also pass the filter and be directed to the membrane.

The catalytic membrane supports the catalysts so that ions are implanted on one side and nanotubes grown on the other to avoid erosion or contamination of the grooving nanotube caused by direct exposure to the ion beam. In one configuration, the catalysts are attached to the underside of a membrane formed of a non-porous material. The ions must penetrate through the membrane and be implanted into the catalysts. Wells may be formed in the membrane and the catalysts placed therein to reduce the amount of material the ion beam must penetrate and to provide a defined region for growing each nanotube. Cavities may be formed in the membrane and catalysts attached to an inner wall facing the implantation region. The ions are implanted through the membrane into the catalysts to grow nanotubes within the cavities. In another configuration, the membrane is formed of a porous material. The catalysts may fill the pores so that the ion beam implants ions into the catalysts on the top side of the membrane to grow nanotubes on the underside of the membrane away from the ion beam. A layer of catalyst material may be formed over the membrane facing the ion source. Ions are implanted into the catalyst layer causing nanotubes to grow through the pores in the membrane and away from the ion beam. If catalysts are attached to the underside of the membrane, the ions will pass through the pores into the catalysts to grow nanotubes away from the ion beam. Use of the catalytic transmembrane to separate ion implantation from nanotube growth prevents the ion beam from damaging the nanotubes. There are many different ways to configure the catalytic transmembrane.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 9a-9f are diagrams of different catalytic transmembrane geometries using non-porous and porous materials; and FIGS. 10a-10g are diagrams of an exemplary process for fabricating the catalytic transmembrane.

DETAILED DESCRIPTION OF THE INVENTION

Figure 1:
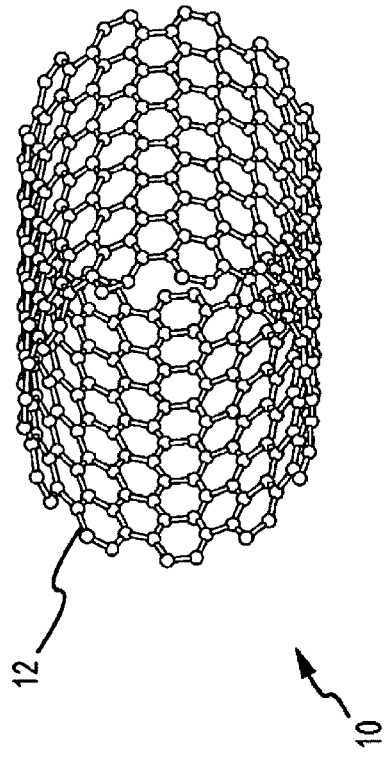
FIG. 1, as described above, is a diagram of a carbon nanotube.
Figure 2A:
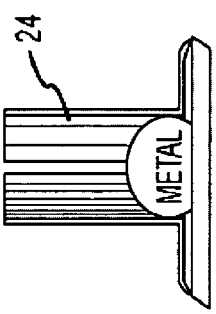
FIGS. 2a-2b, as described above, are diagrams illustrating root and tip CNT growth.
Figure 2A:
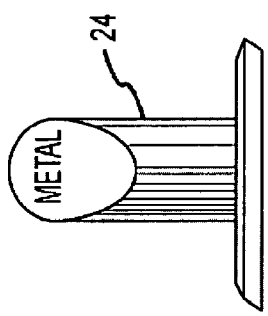
Figure 2B:
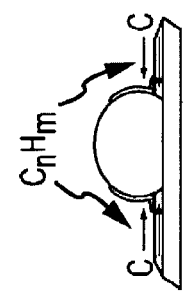
Figure 2B:
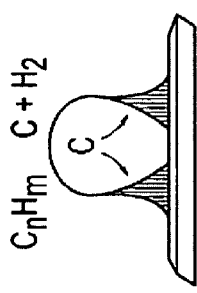
Figure 2B:
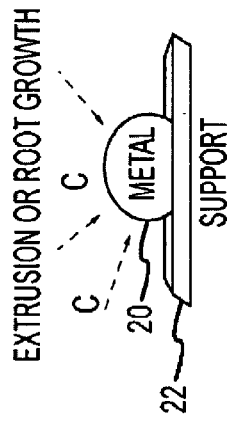
Figure 2B:
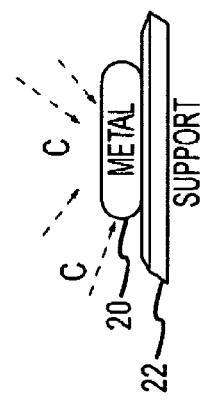
Figure 3:
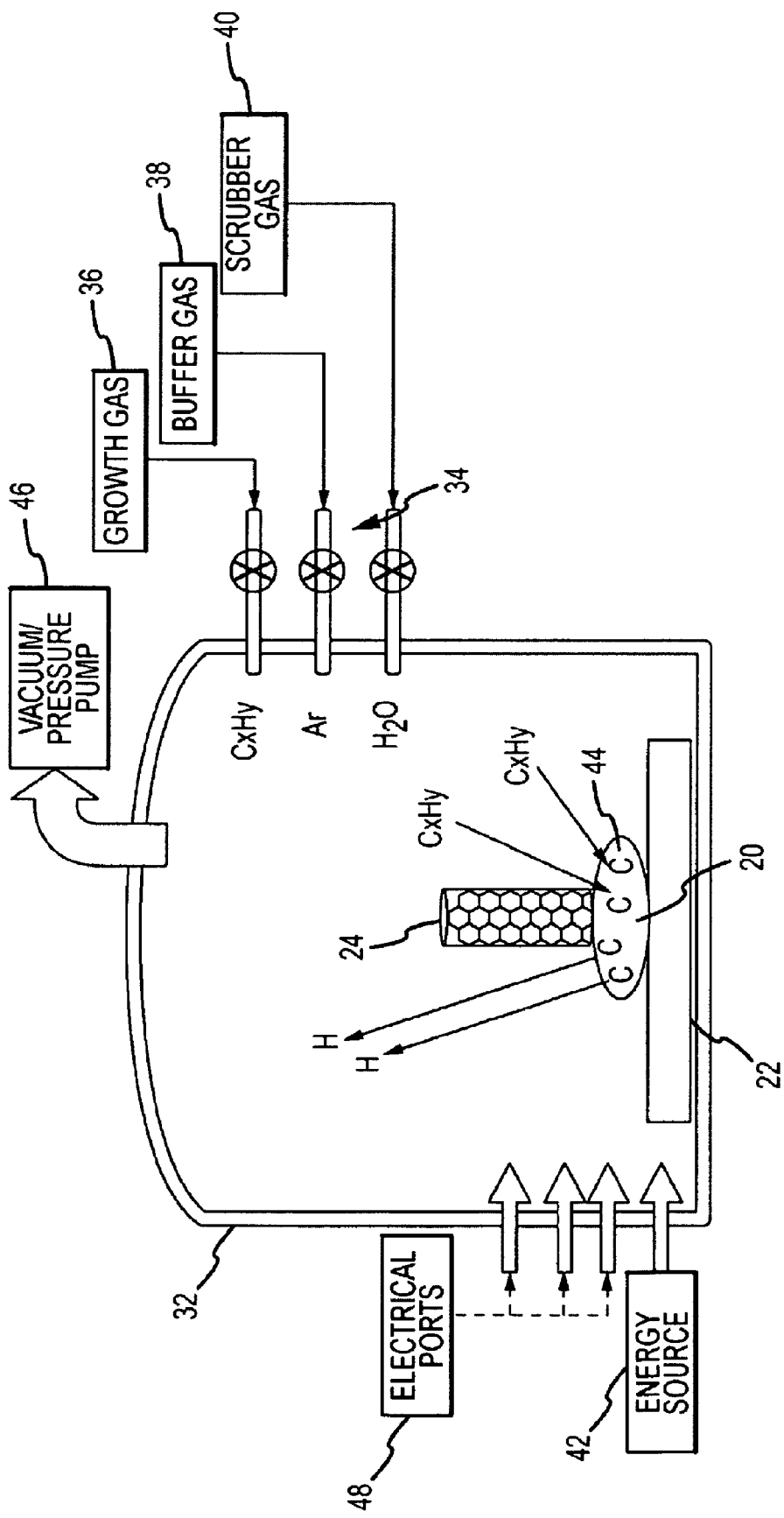
FIG. 3, as described above, is a diagram of a conventional CVD process using a single feedstock-growth chamber to grow CNTs on a substrate.

The present invention provides a system and method of ion implantation for growing nanotubes of one or more elements selected from Carbon (C), Nitrogen (N), Boron (B), Titanium (Ti), Silicon (Si), Germanium (Ge), Aluminum (Al) and Gallium (Ga) with a specified and possibly varying isotope composition. Each of these elements has multiple isotopes of which a subset (less than all) is downselected to grow nanotubes. The nanotubes may be formed from a single element such as carbon, boron or silicon or from unique molecular combinations of two or more different isotopes from elements such as boron-nitride, boron-carbide, $C_iB_jN_k$ where i,j and k are any non-negative integers, or Silicon-Carbon. The nanotubes may be formed from a subset of isotopes from one of the listed elements paired with another single-isotope element such as niobium (Nb), aluminum (Al) or arsenic (As) e.g. Nb12C, 27Al69Ga or 75As 71Ga. The entire length of the nanotube may be grown with a single pure composition e.g. 12C. Alternately, the nanotube can be uniformly or selectively doped with various dopant atom concentrations. Furthermore, the base isotope composition may be changed to form isotope-junctions such as 12C-13C, molecular-junctions such as 26Al14N-26Al15N or element-junctions such as 12C-10B14N.

Ion Implantation Viability

The conventional wisdom of those skilled in the art of nanotubes and techniques for growing nanotubes would suggest that ion implantation is not a viable approach for growing nanotubes. Accepted practice would indicate that the erosion rates of the target, implantation depth of ion, growth rates of nanotubes and degradation of the nanotubes from direct exposure to the ion beam would be incompatible with the growth of high-quality nanotubes in a reasonable amount of time. Furthermore, the transition between the growth of different isotopes would be too slow to provide a well-defined isotope-junction. We have configured an ion implantation system and performed the requisite calculations, simulations and tests to demonstrate that these assumptions are incorrect, and that within the design space for growing nanotubes of different isotope compositions from different elements parameters can be selected to satisfy all of these criteria. The specific set of parameters (e.g. catalyst material and geometry, beam energy and current, target thickness, etc.) will of course depend on the properties of the nanotubes to be grown.

In general, any ion implantation system must satisfy three criteria. First, the erosion rate caused by ion beam sputtering of the target (catalytic transmembrane) must be stable for a sufficient time to grow the nanotubes. Second, for the required dimensions of a catalytic particle to grow the desired nanotube geometry (e.g. a single-walled nanotube of a specified diameter), the ion beam energies must be reasonable. Thirdly, the available ion flux must grow a sufficient number of nanotubes each at a sufficient growth rate to be viable. The system must also prevent degradation of the growing nanotubes due to exposure to the ion beam. If isotope-junctions are to be grown, the transition from one isotope (molecule) to another must be sufficiently fast. The transition will be very sharp due to the small volume of the catalytic particle, fast isotope diffusion rate through the particle and low solubility in the particle at the implantation temperatures.

Figure 4:
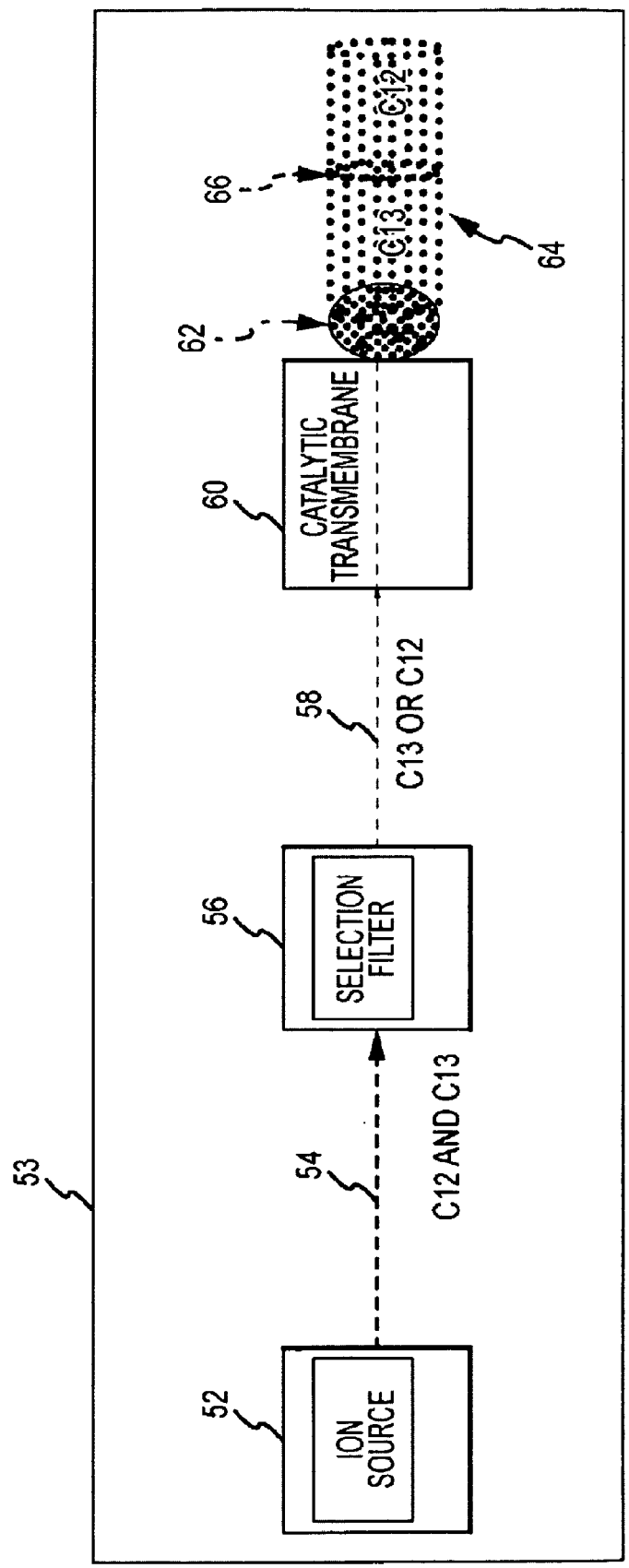
FIG. 4 is a schematic diagram of an ion implantation processing for forming nanotubes of a specified isotope composition using a transmembrane.
Figure 5:
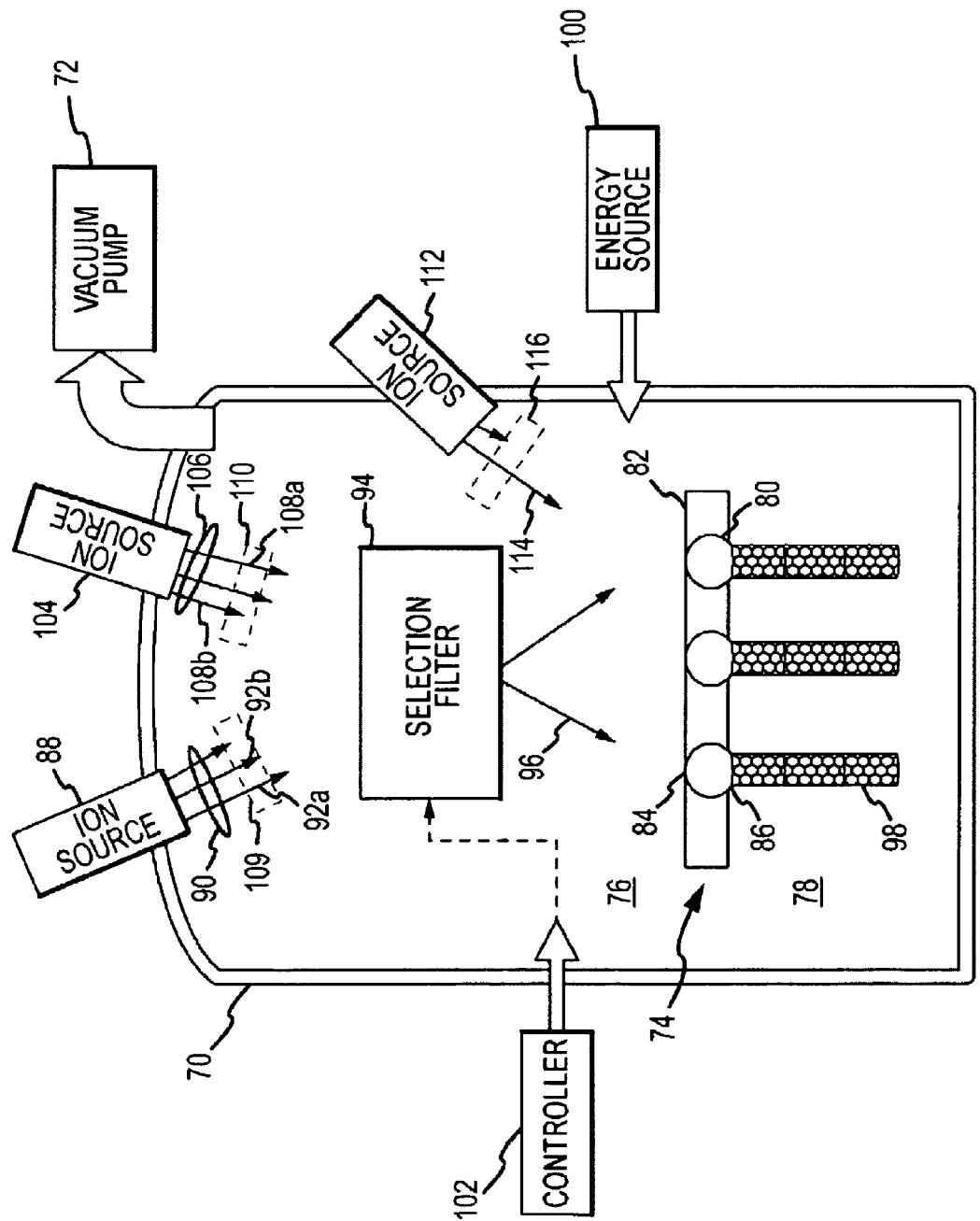
FIG. 5 is a diagram of an ion implantation chamber and selection filter for forming nanotubes of a specified isotope composition on a catalytic transmembrane.

Without loss of generality, let us consider each criterion separately and for an integrated design for the case of growing pure 12C-13C isotope junctions in reference to FIG. 4. The design space is driven by the type of nanotube (SWNT or MWNT) and the desired diameter of the nanotube. This determines the diameter of the catalytic particle, which in turn determines the implantation depth and beam energy. The beam energy is also a function of the substrate thickness (and any anti-sputtering layers) that must be penetrated to implant the ions into the catalyst, the number of nanotubes and desired growth rate.

To grow a single-walled 12C-13C junction, an ion source 52 in vacuum chamber 53 directs a primary ion beam 54 including both 12C and 13C isotopes through a selection filter 56. The selection filter separates the primary beam into as 12C secondary beam and a 13C secondary beam and directs one secondary beam 58 towards a catalytic transmembrane 60. The isotopes are implanted into one side of the catalytic particle 62 where they are neutralized and nanotubes 64 are grown from that isotope on the other side of the particle. The selection filter then directs the other secondary beam towards the membrane to continue nanotube growth from the other isotope to produce an isotope junction 66 in the nanotube.

The following results are normalized to one micro amp of current in the primary ion beam. Catalytic particles (Fe, Co, Ni) of 1 to 10 nm in diameter are formed in or on the underside of the transmembrane, which is typically approximately 5 to 50 nm thick and suitably Silicon. The particle size is determined by the desired diameter and type (SWNT or MWNT) of the nanotubes. Depending upon the membrane thickness that must be penetrated, beam energies of 0.1 KeV to 10 KeV produce implantation depths of 0.1 to 10 nm. This demonstrates that at reasonable energy levels, a catalytic particle of dimensions required to grow the nanotube will also stop the ion. The erosion rate at 0.1 KeV is small, approximately one ion of membrane eroded for every ten carbon ions implanted. Erosion increases with energy up to approximately one membrane ion for each implanted ion at 10 KeV. If the erosion rate is too high, depending upon the transmembrane geometry either anti-sputtering layers can be used or a secondary membrane can be inserted during growth to maintain constant energy for constant implant depth. This demonstrates that erosion of the target is manageable. Depending upon the beam flux, tens of millions of nanotubes may be simultaneously grown, each at a rate of 50 nm to 10 microns per hour. For one nanometer diameter nanotubes, the one micro amp/cm square beam produces ion flux that will grow approximately 2.5×10e8 CNT/hr each with length of approximately 250 nm. This demonstrates that a sufficient number and length can be grown for commercial viability. The selection filter can filter the ions to better than 1 part in 1000 to grow 'pure' nanotubes. The grooving nanotubes are shielded from the ion beam by the catalytic transmembrane. Lastly, the one nm nanotube is formed from twenty 12C or 13C atoms per ring with seven rings. The transition from 12C to 13C at the junction will include only one or two impurity isotopes over 3 to 4 rings. This demonstrates that well-defined highly pure isotope-junctions can be grown.

Ion Implantation System

A chamber 70 is held at a vacuum level suitable for ion implantation by a vacuum pump 72. A catalytic transmembrane 74 separates the vacuum chamber into implantation and growth regions 76 and 78. The transmembrane includes one or more catalysts 80 supported by a membrane 82 with each catalyst having a first portion of catalyst surface 84 facing the implantation region and an opposing second portion of catalyst surface 86 facing and directly exposed to the growth region. Catalyst 80 is typically a single 3D nano-particle such as Fe. Co and/or Ni that provide the requisite solubility and fast diffusion to the implanted ions but could be multiple nano-particles of varying geometry or a layer of catalytic material. In a typical configuration, the membrane simply separates the ion beam from the growing nanotubes to avoid direct exposure that may erode or contaminate the nanotubes. The membrane could be configured to form an environmental seal between the two regions allowing their respective environments to be independently controlled. However, since ion implantation and growth typically occur at vacuum this is not necessary.

An ion source 88 generates a primary beam 90 of ions including a plurality of different isotopes or unique molecular combinations of two or more different isotopes from at least one of the selected elements 92a, 92b, . . . . A selection filter (or filters) 94 directs a subset 96 (less than all) of those ions towards the membrane resulting in ion implantation through the first portion of catalyst surface 84 into catalyst 80, and growth from the opposing second portion of catalyst surface 84 of nanotubes 98 composed of at least one isotope in the subset. The ions may be either positively or negatively charged and, upon implantation, are neutralized in the catalyst. The thermal energy required for nanotube growth may be provided by the beam energy itself and/or an external energy source 100 that heats the catalysts.

As will be discussed in greater detail, a typical selection filter 94 separates the primary beam 90 into multiple secondary beams based on the mass number of the ion. The desired subset 96 of secondary beams, typically one, is directed to the substrate. However, any filter arrangement that can extract the desired subset of ions and direct them to the substrate is contemplated by the invention. A controller 102 may reconfigure the selection filter 94 to direct a different subset (secondary beam(s)) 96 of ions for the same or different selected element towards the membrane to alter the isotope composition of the growing nanotubes 98.

A second or even third ion source may be required or simply preferred to grow nanotubes of the specified isotope composition. For example, growth of Silica-Carbide nanotubes may require two sources and growth of Carbon-Boron-Nitride may require three sources. An ion source 104 generates a primary beam 106 of ions including a plurality of different isotopes or unique molecular combinations of two or more different isotopes from at least one of a different selected element 108a, 108b, . . . . Depending upon the nanotube structure being grown and the specific implementation, the primary beams 90 and 106 may be directed through the same or different selection filters. Optional pre-filters 109 and 110 may be used to selectively block one of the primary beams.

These structures can be doped with dopant atoms using different means. The source 88 may include a small amount of dopant material that looks like the desired ion to the filter and thus is included as part of the subset directed towards the catalysts. For example, a small amount of the 11B1H molecule could be included with a carbon source. If the filter is configured to pass ions having a mass number of twelve, 12C and 11B1H ions will be directed towards the substrate. The H atom will break away upon implantation leaving 11B dopant atoms in the 12C lattice. This is an effective approach for achieving uniform doping concentration. Alternately, a separate source 104 of dopant ions may be provided and directed through the same filter. By controlling the source or pre-filter 110, the dopant concentration can be varied or turned on and off entirely. A separate source 112 of dopant ions 114 and separate selection filter 116 can be used to dope the nanotube lattice with dopant atoms that do not look like the selected isotopes. If isotope selection of the dopant atoms is not required, the dopant source 112 can be directed at the substrate sans selection filter 116.

Isotope Compositions of Nanotubes

This approach provides the means to grow nanotubes having a specified isotope composition from one or more elements doped or undoped at very high purity levels with definition to realize nanotube structures that researchers have only simulated and structures and devises not yet envisioned. The approach can grow pure single isotope or unique molecular combination nanotubes, doped or undoped. The approach can also grow isotope, molecular or elemental junctions, doped or undoped.

Case 1: Single-Isotope or Unique Molecular Combination

Figure 6A:
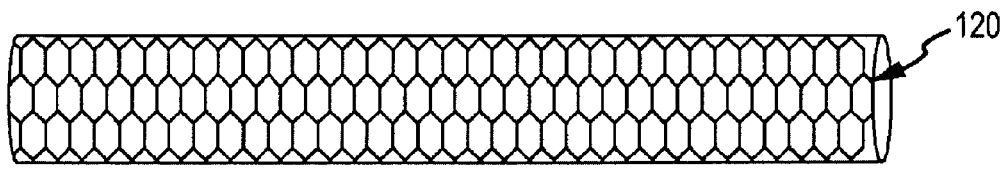
FIGS. 6a through 6e are diagrams depicting different isotope compositions grown in accordance with the present invention.

A simple yet very important nanotube structure 120 is that of a pure single-isotope or unique molecular combination of two or more different isotopes as shown in FIG. 6a. These types of nanotube structures may be useful in a wide range of devices including semiconductor, spin transport, or optical pumping devices.

In an exemplary embodiment, a source 50 emits a primary beam 54 including 12C, 13C and perhaps 14C isotopes of carbon ions. The filter 68 is configured to pass only the desired single isotope, e.g. 12C. In other words, the subset includes only the single 12C isotope. The resulting nanotubes can be grown with a purity of at least 99.9% 12C. A small amount of unintentional contaminants (the blocked isotopes) may pass through or around the filter but the amount is very small.

Carbon nanotubes are of particular commercial interest. Naturally occurring carbon includes approximately 98.9% 12C, 1% 13C and $10^{-10}$% or less 14C. Naturally carbon is dominated by the 12C isotope but this is not sufficiently pure to form "pure" single-isotope CNTs or isotope junctions, minimum purities levels in excess of 99.9% are required to meet that standard. Carbon can be manufactured to have almost any desired composition of 12C, 13C and even 14C except that carbon cannot be manufactured with a single pure isotope to the required standard. To achieve pure carbon isotopes, an enriched source may be required.

In another embodiment, source 50 emits a primary beam 54 including unique molecular combinations of different isotopes 10B10B14N, 10B11B14N, 10B10B15N, 10B11B15N and 11B11B15N. The filter 68 is configured to pass only a single molecule e.g. 10B10B14N to grow pure nanotubes.

Case 2: Uniform Doping of Single-Isotope or Unique Molecular Combination

Figure 6B:
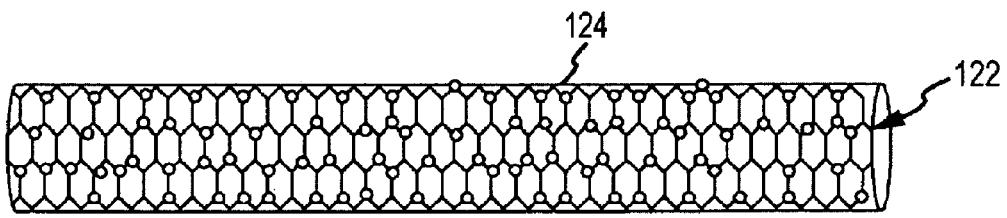

Another important nanotube structure 122 is that of a single isotope or single unique molecular combination of two or more different isotopes uniformly doped with a dopant atom as shown in FIG. 6b. The dopant atoms 124 take the place of element atoms in the lattice. These types of nanotube structures may be useful in semiconductor devices such as diode or transistor designs, or optical pumping devices, such as quantum cascade lasers.

To provide a continuous uniform doping of, for example, a 12C nanotube, the carbon source 50 might include a dopant molecule having the same weight as the desired element isotope, in which case the dopant molecule will pass through the isotope selection filter. For example, if the selection filter is tuned to pass ions with atomic weight of 12, both 12C ions and 11B1H dopant molecule ions will pass. The 11B1H molecule will break apart when it collides with the catalysts 72 with the B11 ion being implanted into the catalyst and the hydrogen (H) atom being removed by the vacuum pump. In this case, the subset includes the 12C isotope and the 11B1H molecule. The isotopes 12C and 10B are implanted into the catalyst.

Case 3: Selective Doping of Single-Isotope or Unique Molecular Combination

Figure 6C:
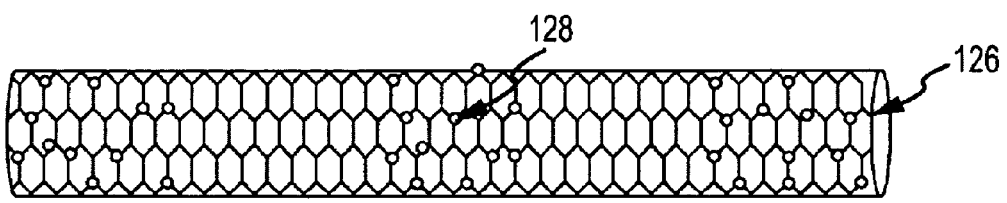

Another important nanotube structure 126 is that of a single-isotope or single unique molecular combination of two or more different isotopes selectively doped with a dopant atom as shown in FIG. 6c. The dopant atoms 128 take the place of element atoms in the lattice in desired zones. These types of nanotube structures may be useful in nanoelectronic and spintronic devices.

To provide selective doping of, for example, a 12C nanotube, the source 50 emits a primary beam including multiple isotopes 12C, 13C and 14C. The filter directs only the 12C isotope to the membrane. In one embodiment, the secondary ion source 104 emits a primary ion beam including multiple dopant isotopes, e.g. 11B1H and 12B1H directed to the same filter. The 11B1H ions look like 12C ions and are directed towards the substrate where the 11B ions are implanted into the catalyst and form dopant sites in the 12C lattice. The primary beam of dopant isotopes is modulated to vary the concentration of dopant atoms and/or selectively blocked by the prefilter to suspend doping for some length of nanotube growth. In another embodiment, source 112 emits a primary beam including multiple dopant molecules, e.g. 12C14N and 12C15N directed through a different filter 116 that directs a second subset of those dopant molecules towards the substrate. These molecules have a different mass than the desired carbon isotope and thus cannot be passed through the same filter. In yet another embodiment, if selection of the dopant isotopes is not required filter 116 can be omitted or configured to pass all of the isotopes. If the dopant ions pass through the same filter as the element ions they are part of the subset that is directed by the filter to the substrate. If they pass through a different filter, that filter directs a second different subset of dopant isotopes towards the substrate.

A single dopant atom takes the place of an element atom in the nanotube lattice. Dopant atoms may also form contiguous islands of atoms such as a hexagonal cluster. This method allows placement of dopant atoms within a small range of lattice sites, probably 2-10 lattice rings. The ability to controllably dope pure single-isotope nanotubes is highly desirable in nanoelectronic devices.

Case 4: Homogeneous Lattice from Different Isotopes or Molecules

Another nanotube structure is that of a homogeneous lattice formed from two separate isotopes or molecules having different mass numbers. The two different isotopes and/or molecules may comprise the same or different base elements from which to grow the nanotube lattice.

In one embodiment, a single source 88 emits a primary beam that includes multiple isotopes (molecules) for a first element and at least one isotope (molecule) for a second element. The controller 102 switches selection filter 88 rapidly to first pass a first subset, typically one, isotope (molecule) of the first element and then a second subset, typically one, isotope (molecule) of the second element. By rapidly switching back-and-forth, the two different isotopes (molecules) are effectively implanted into the catalyst as if they passed through the filter together. As a result, the nanotube lattice is a homogeneous growth of the two isotopes and/or molecules. In one example, the source emits a primary beam that includes 12C, 13C, 14C and 93Nb (Nb has only one isotope). The filter rapidly switches to alternately pass 12C and 93Nb to grow a 93Nb12C nanotube.

In another embodiment, ion source 88 emits a primary beam that includes the multiple isotopes (molecules) for the first element and ion source 104 emits a primary beam that includes at least one isotope (molecule) for the second element. Their respective selection filters 94 are configured to pass the first and second subsets respectively. For example, the first filter directs 12C ions towards the substrate and the second filter directs 93Nb ions towards the substrate to grow 93Nb12C nanotubes. This approach avoids the rapid switching but requires two sources and two filters in general. Elements such as Nb that have only one isotope do not require a filter.

In another embodiment, ion source 88 emits a primary beam that includes at least two different isotopes (molecules) of the same base element that have different mass number but the same charge-to-mass ratio Q/M. For example, a carbon source may produce $12C^-$ and $12C_2^=$ molecules. The first isotope has a mass number of twelve and a single negative charge. The second molecule has a mass number of twenty-four and a double negative charge. Consequently, they have the same Q/M ratio and will thus appear the same to a typical Q/M filter. The other carbon isotopes would be blocked and the nanotube grown from a mixture of $12C^-$ and $12C_2^=$ isotopes.

In another embodiment, ion source 88 emits a primary, beam that includes at least two different isotopes (molecules) that have different mass number and same charge but a different energy. For example, a first isotope has mass number of twelve and a second isotope has a mass number of twenty-four. If the mass twelve isotopes are accelerated at an energy twice that of the mass twenty-four isotopes they will have the same momentum and thus will appear the same to a typical momentum filter. Note, a momentum filter assuming equal energies simplifies to a Q/M filter, which assuming equal charge simplifies to a mass selection filter.

Any of these embodiments can be augmented with either of the uniform or selective doping techniques over a portion of or the entire length of the grown nanotubes.

Case 5: Isotope, Molecular or Element Junctions

Figure 6D:
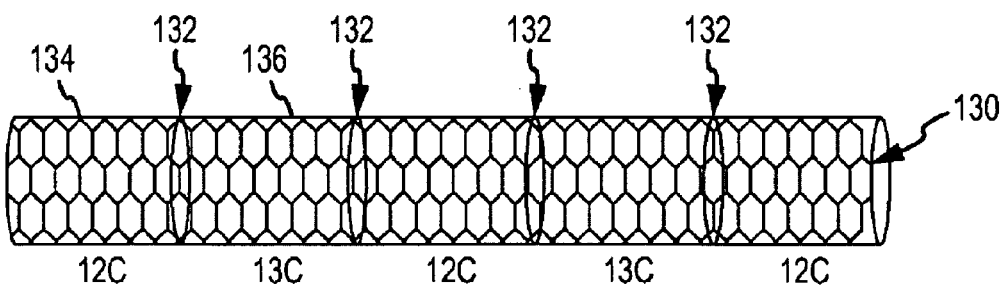

Another very important nanotube structure 130 is that of a junction 132 formed between two different isotopes or molecules of the same or different elements as shown in FIG. 6d. These types of nanotube structures may be useful in spintronic and thermionic control devices.

In an exemplary embodiment, a source 88 emits a primary beam 90 including 12C, 13C and perhaps 14C isotopes of carbon ions. The filter 94 is configured to first pass only 12C 134 and then reconfigured to pass only 13C 136. In other words, the subset includes only the single 12C isotope and is then reconfigured to include only the single 13C isotope. The resulting sections of nanotubes can be grown with a purity of at least 99.9% 12C or 13C. A small amount of unintentional contaminants (the blocked isotopes) may pass through or around the filter but the amount is very small.

Figure 6E:
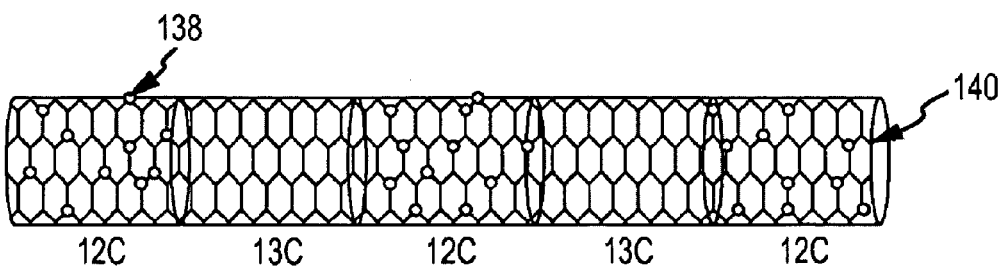

Any of these embodiments can be augmented with either of the uniform or selective doping techniques over a portion of or the entire length of the grown nanotubes. For example, as shown in FIG. 6e the ion source also includes 11B1H molecules, which pass through the selection filter with the 12C isotopes but are block during implantation of the 13C isotopes. This produces selective doping of the 12C zones with 11B atoms 138 in the 12C-13C junction 140.

Selection Filters

The selection filter directs a subset (less than all) of ions in the primary beam towards the membrane to grow nanotubes of a specified isotope composition. A typical filter separates the primary beam into secondary beams according to the mass number of the ions, however any filter arrangement that can extract the desired subset of ions and direct them to the membrane is contemplated by the invention. A controller may reconfigure the selection filter to direct a different subset (secondary beam(s)) of ions for the same or different selected element towards the membrane to alter the isotope composition of the growing nanotubes.

Figure 7:
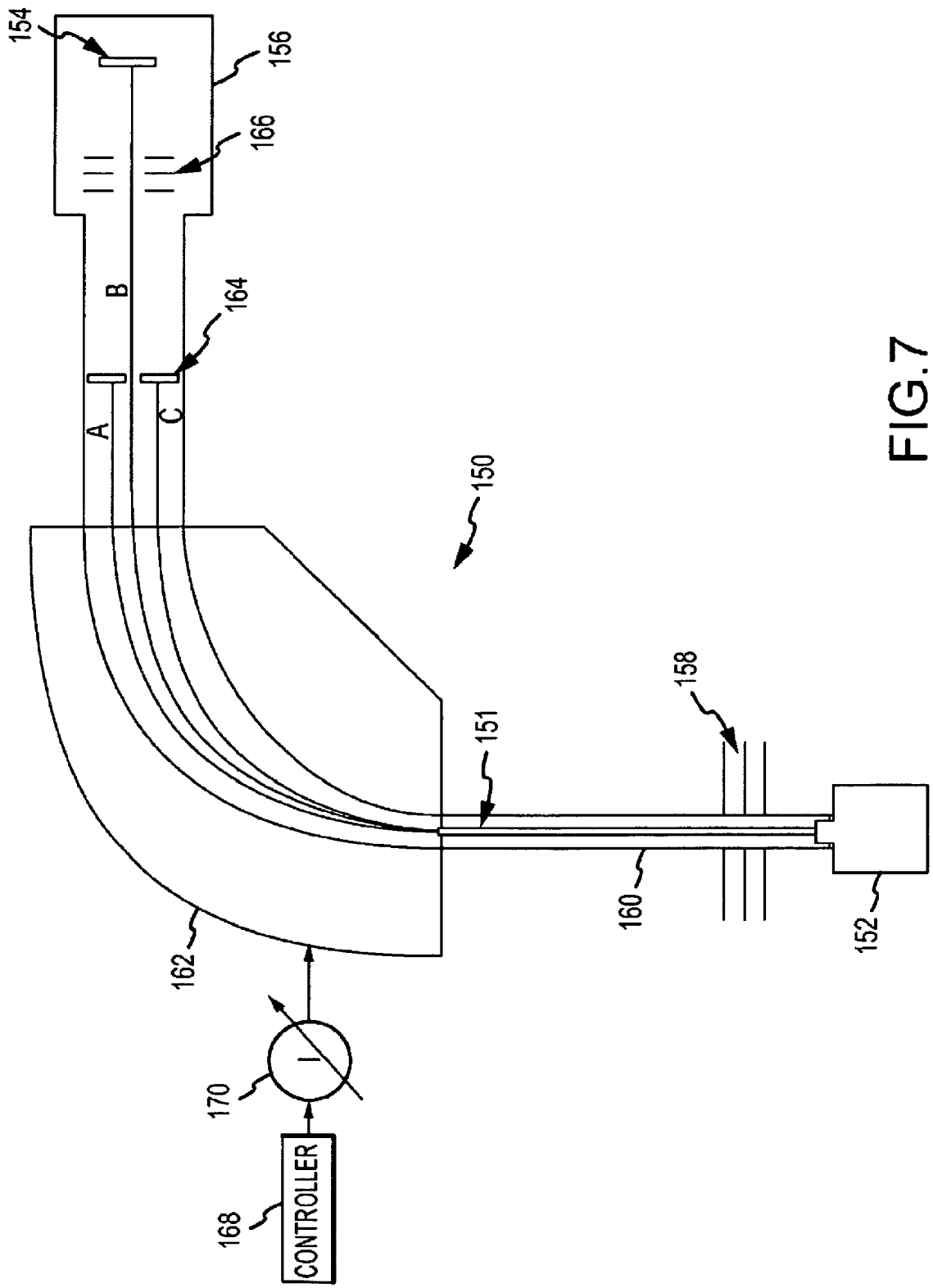
FIG. 7 is a diagram illustrating an electromagnetic mass selection filter.

In an exemplary embodiment shown in FIG. 7, a selection filter 150 carries a primary ion beam 151 from an ion source 152 and directs a subset of those ions onto a catalytic transmembrane 154 in a deposition chamber 156. An electric field ion-acceleration stage 158 provides all primary ions the same energy. An evacuated flight tube 160 carries ions from the ion source to an electromagnetic filter 162 that separates ions into secondary beams A, B and C according to mass/charge ratio for equal energy ions, hence mass for equal charge ions. The desired subset of ions (e.g. secondary beam B) passes through a slit 164, through an electric field deceleration stage 166 that reduces ion energy (e.g. into the 0.1 to 10 KeV range) and onto the membrane. The radius of curvature of the secondary beams moving through the magnetic field is proportion to the square root of the energy and inversely proportional to the magnetic field. In this embodiment, the controller 168 adjusts the amount of current from current source 170 applied to the electromagnetic filter to change the magnetic field and select the desired secondary beam to pass through slit 164 to the target. The attainable switching speeds may be relatively slow, on the order of a second or longer, depending on the size of the electromagnet and current source capabilities of the power supply. Depending upon the structure and growth rates, switching the magnetic field may or may not be acceptable. If the isotope composition is changing frequently and the growth rates are high, faster switching may be needed.

Figure 8:
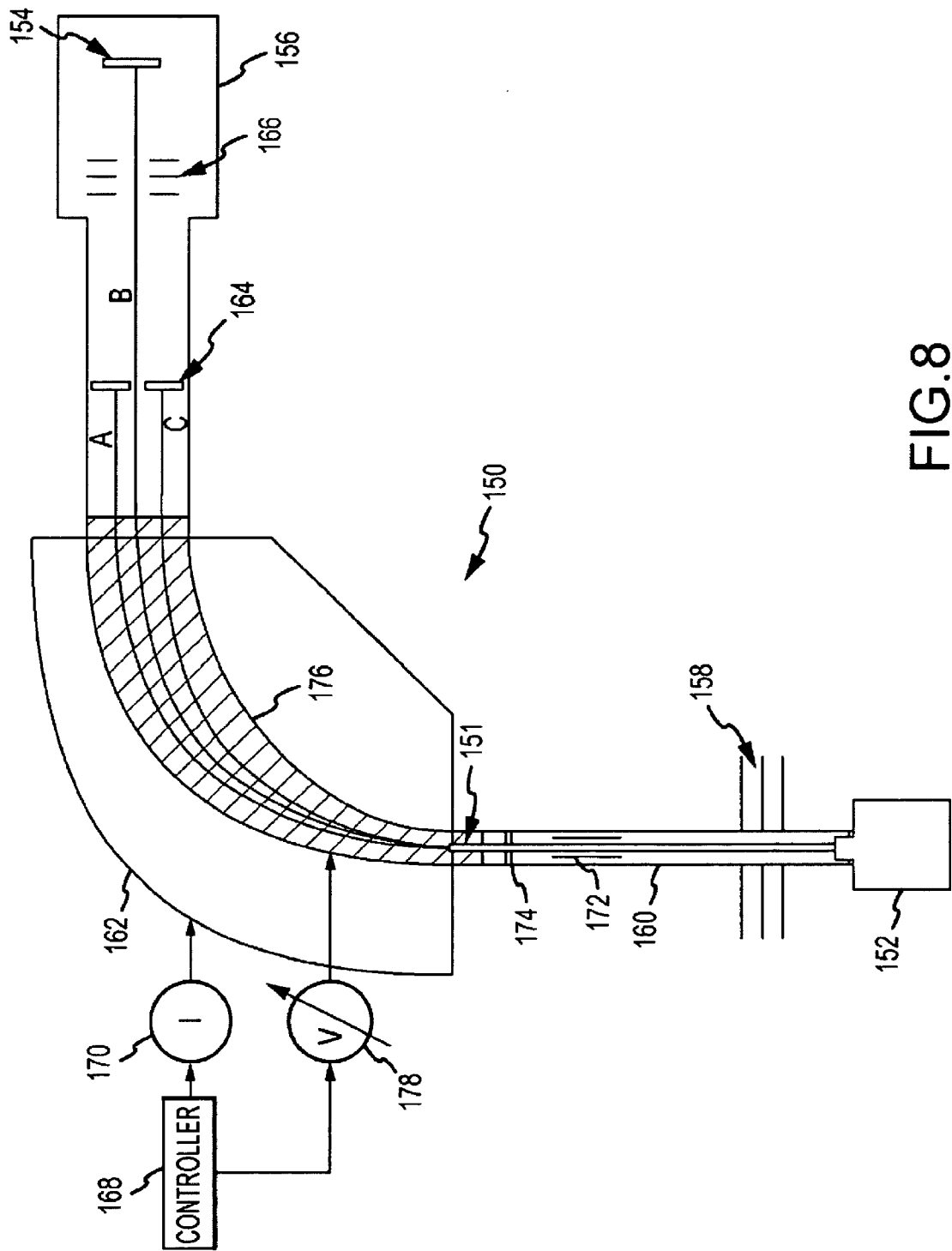
FIG. 8 is a diagram of a composite electromagnetic and electrostatic bouncer chamber selection filter.

In another embodiment shown in FIG. 8, the selection filter 150 includes means to switch the primary beam on and off, which may be useful when using multiple ion sources for example, and means to switch the filter more rapidly. A prefilter includes a deflection stage 172 that, when activated, creates an electric field that deflects the primary ion beam which is blocked by slit 174. The prefilter effectively turns the primary beam on or off. To increase switching speed, an electrostatic bouncer chamber 176 is placed inside the electromagnetic filter. A voltage source 178 applies a voltage to the bouncer chamber relative to ground to accelerate (or decelerate) the ions during traversal of the chamber. This is the same as changing the energy of the ions while in the chamber. Two ions of the same mass/charge ratio but of different energies will traverse different trajectories while passing through the magnetic field. Thus, by changing the energy of the secondary ion beams from one state to another, all of the ion beams can be moved back and forth so that only the selected secondary beam will pass through slit 164. The controller can change the bouncer voltage on the order of microseconds thereby achieving much faster switching times.

Catalytic Transmembrane Geometries

The catalytic membrane 74 supports the catalysts so that ions are implanted on one side and nanotubes grown on the other. The catalysts are typically a single 3D particle such as Fe, Co and Ni that provide the requisite solubility and diffusion rate to the implanted ions. The catalysts could be multiple nano-particles of varying geometry or a layer of catalytic material. In a typical configuration, the membrane simply separates the ion beam from the growing nanotubes to avoid direct exposure to the ion beam that may erode or contaminate the nanotubes. The membrane could be configured to form an environmental seal between the two regions allowing their respective environments to be independently controlled. However, since ion implantation and growth typically occur at vacuum this is not necessary. There are many different ways to configure the catalytic transmembrane. A few exemplary configurations are illustrated in FIGS. 9a through 9f.

In one configuration shown in FIG. 9a, the catalysts 190 are attached to the underside of a membrane 192 formed of a non-porous material. The ions must penetrate through the membrane and be implanted through a first portion of catalyst surface 194 facing the ion beam into the catalysts to grow nanotubes 196 on an opposing second portion of catalyst surface 198.

In another configuration shown in FIG. 9b, wells 200 are formed in the membrane 202 and the catalysts 204 placed therein to reduce the amount of material the ion beam must penetrate and to provide a defined region for growing each nanotube 206. The wells are closed where the catalysts are attached and open at the opposite end for growing nanotubes there through.

Figure 9C:
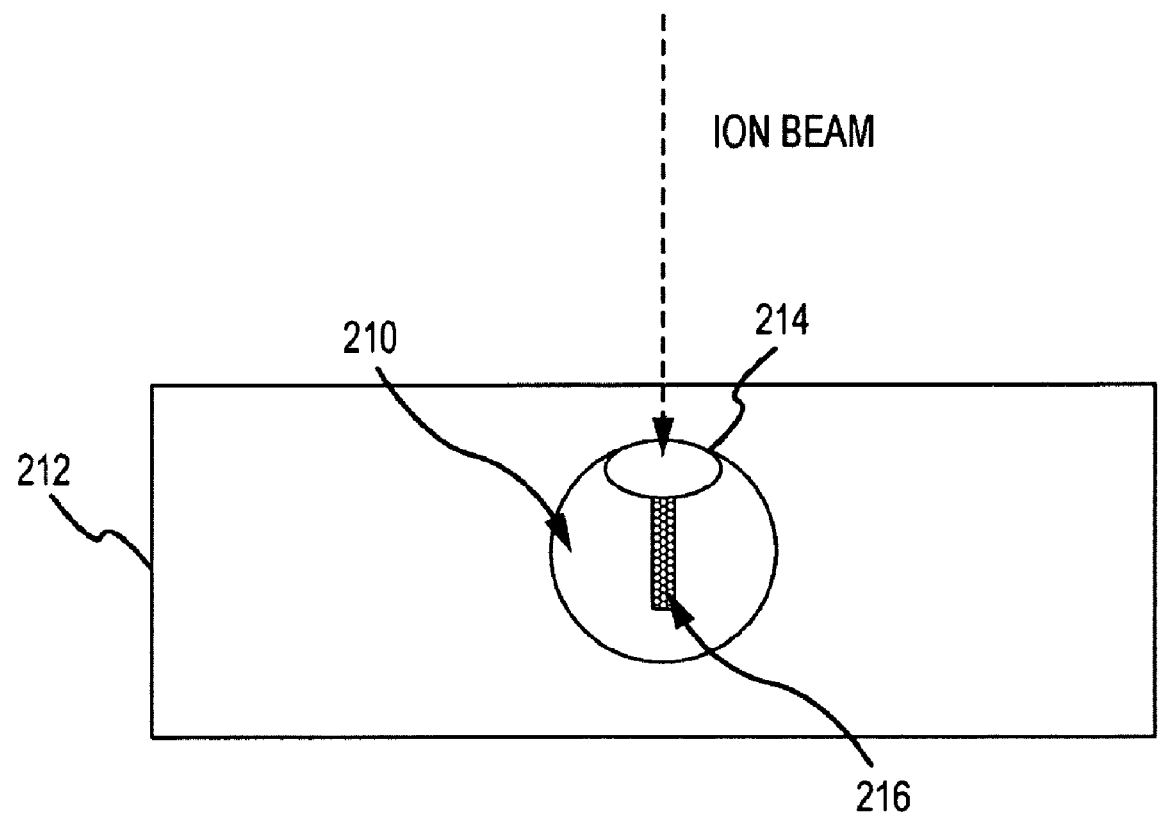

In another configuration shown in FIG. 9c, cavities 210 are formed in the membrane 212 and catalysts 214 attached to an inner wall facing the implantation region. The cavities are either enclosed on all sides, forming individual pores inside the membrane or a long cylindrical cavity that supports multiple catalysts. The ions are implanted through the membrane into the catalysts to grow nanotubes 216 within the cavities. This configuration may be used in 3-D integrated circuits. Multiple cavities may be linked together connected by nanotube circuits.

In another configuration shown in FIG. 9d, the membrane 220 is formed of a porous material. The catalysts 222 fill the pores 224 so that the ion beam implants ions into the catalysts on the top side of the membrane to grow nanotubes 226 on the underside of the membrane away from the ion beam.

As shown in FIG. 9e, a layer of catalyst material 230 may be formed over the porous membrane 232 facing the ion source. Ions are implanted into the catalyst layer causing nanotubes 234 to grow through the pores 236 in the membrane and away from the ion beam.

Figure 9F:
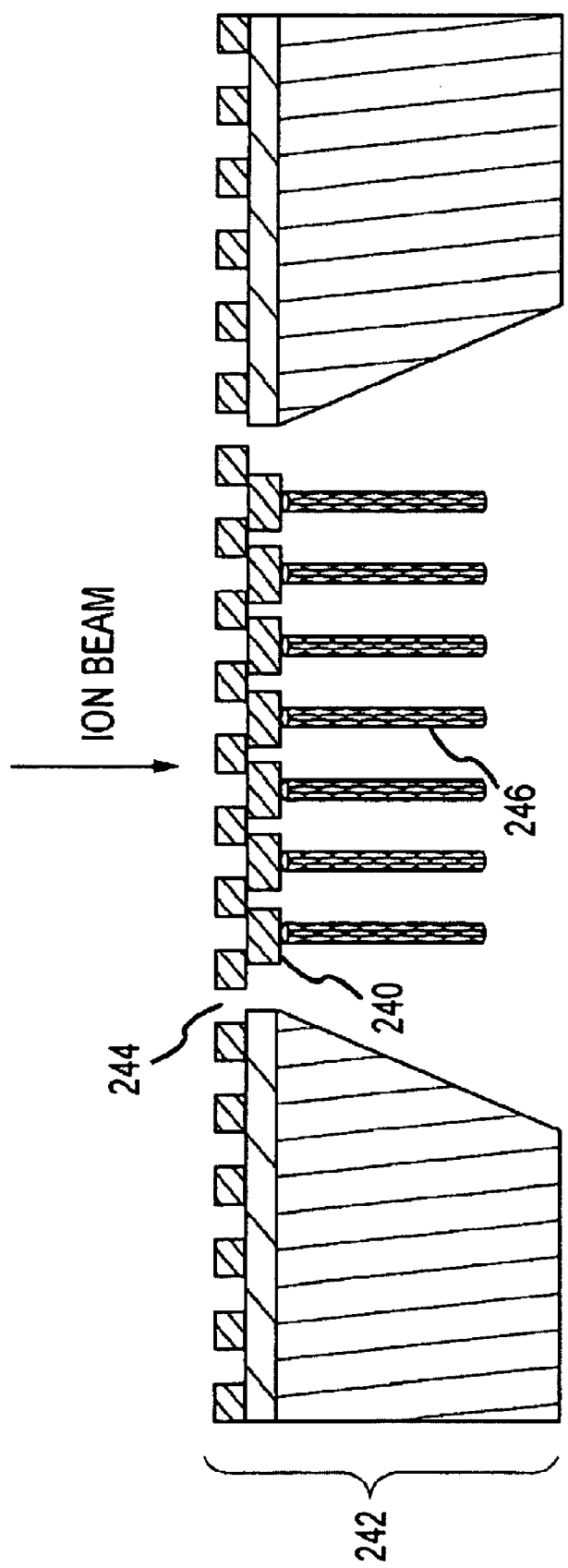

As shown in FIG. 9f, catalysts 240 are attached to the underside of the membrane 242 so that the ions will pass through the pores 244 into the catalysts to grow nanotubes 246 away from the ion beam.

A method of fabricating the porous transmembrane 220 and implanting catalysts 222 into the pores shown in FIG. 9d is illustrated in FIG. 10a through 10g. For convenience, we start with a porous nano-crystalline silicon (pnc-Si) membrane of the type described by Christopher Stiemer et al. "Charge- and size-based separation of macromolecules using ultrathin silicon membranes" NATURE. Vol. 445, 15 Feb. 2007, pp. 749-753 for filtration of nanoparticles from approximately 5 nm to 25 nm and evaporate catalytic material such as Fe into the pores to form the catalytic nano-particles. Other methods of forming the transmembrane are contemplated by the current invention.

In an exemplary embodiment, a 500 nm thick layer 250 of $SiO_2$ is grown on both sides of a silicon wafer 252. On the backside of the wafer, the $SiO_2$ is patterned using standard photolithography techniques to form an etch mask 254 for the membrane formation process. The frontside oxide is then removed, and a high quality three layer film stack 256 (20 nm $SiO_2$/15 nm a-Si/20 nm $SiO_2$) is deposited on the front surface using RF magnetron sputtering. To form the pnc-Si membranes, the substrate is briefly exposed to high temperature in a rapid thermal processing chamber, crystallizing the a-Si into a nanocrystalline film thereby forming the pores. The patterned wafer back side is then exposed to a highly selective silicon etchant, EDP, which removes the silicon wafer along crystal planes until it reaches the first $SiO_2$ layer of the front side film stack to form cavity 258. Exposing the three layer membrane to buffered oxide etchant removes the protective oxide layers, leaving the freely suspended ultra thin pnc-Si membrane 220. Thereafter, iron is evaporated at high temperature, which, upon heating, forms droplets that are drawn into the pores via capillary action leaving a catalytic transmembrane whose pores are sealed with catalytic material 222. Many other methods to fill the nm pores can be found in the scientific literature dealing with nano capillarity such as solution evaporation and sublimation methods, sputtering or atomic layer deposition, or electrolytic deposition. Instead of filling the nm pores, a layer of catalytic material can be formed over the membrane to provide the configuration shown in FIG. 9e or catalysts can be attached to the underside of the membrane to provide the configuration shown in FIG. 9f.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An apparatus for growing nanotubes from one or more specific isotopes of one or more elements selected from among Carbon, Nitrogen, Boron, Titanium, Silicon, Germanium, Aluminum and Gallium, comprising:
   a chamber;
   a membrane that separates the chamber into an implantation region and a growth region;
   one or more catalysts supported by the membrane, said catalyst having a first portion of catalyst surface facing the implantation region and an opposing second portion of catalyst surface directly exposed to the growth region;
   an ion source configured to generate ions from one or more elements, said ions including a plurality of different isotopes or unique molecular combinations of two or more different isotopes from at least one of the selected elements; and
   a selection filter configured to direct a subset of the ions towards the membrane resulting in ion implantation through the first portion of catalyst surface into the catalyst, and growth from the opposing second portion of catalyst surface of nanotubes composed of at least one isotope in the subset.

2. The apparatus of claim 1, wherein the first portion of catalyst surface is attached to the underside of the membrane, said ions directed through the membrane into the first portion of catalyst surface.

3. The apparatus of claim 1, wherein said membrane is configured with one or more wells on its underside, said one or more catalysts' first portion of catalyst surface attached to the underside of the membrane in the bottom of the wells, said ions directed through the membrane into the first portion of catalyst surface to grow the nanotubes on the opposing second portion of catalyst surface in the well.

4. The apparatus of claim 1, wherein said membrane includes one or more cavities formed therein, said one or more catalysts' first portion of catalyst surface attached to an inner wall of the respective one or more cavities facing the implant region, said ions directed through the membrane into the first portion of catalyst surface to grow the nanotubes on the opposing second portion of catalyst surface in the cavity.

5. The apparatus of claim 1, wherein said membrane includes one or more pores that extend there through with said one or more catalysts in said one or more pores, said ions directed onto the first portion of catalyst surface on one side of the membrane to grow the nanotube on the second portion of catalyst surface on another side of the membrane.

6. The apparatus of claim 1, wherein said membrane includes one or more pores that extend there through, said one or more catalysts attached to the underside of the membrane, said ions directed through the one or more pores in the membrane into the first portions of catalyst surface of the one or more catalysts to grow the nanotubes on the opposing second portion of catalyst surface.

7. The apparatus of claim 1, wherein said membrane includes one or more pores that extend there through, said one or more catalysts including a layer of catalytic material on said membrane facing the implantation region, said ions directed onto said layer of catalytic material to grow nanotubes through said one or more pores.

8. The apparatus of claim 1, wherein said selection filter is configured to direct a subset including a single isotope from a first selected element towards the membrane to grow nanotubes from said single isotope.

9. The apparatus of claim 8, wherein the nanotube is comprised of at least 99.9% percent by number of atoms of only said single isotope.

10. The apparatus of claim 8, wherein said selection filter is configured to direct a subset that further includes a single unique molecular combination of two or more different isotopes towards the membrane to grow nanotubes of said single isotope doped with at least one of said two or more different isotopes in said unique molecular combination.

11. The apparatus of claim 8, further comprising another ion source configured to selectively direct dopant-containing ions towards the membrane to grow nanotubes of said single isotope selectively doped with said dopant atoms.

12. The apparatus of claim 11, wherein said dopant-containing ions include a plurality of different dopant isotopes or unique molecular combinations of two or more different dopant isotopes of which one has the same mass number as said single isotope, said dopant-containing ions selectively directed through said selection filter so that said subset includes said single isotope and said one dopant isotope or unique molecular combination of two or more different dopant isotopes with the same mass number.

13. The apparatus of claim 11, wherein said dopant-containing ions include a plurality of different dopant isotopes or unique molecular combinations of two or more different dopant isotopes, further comprising another selection filter configured to pass a second subset of dopant-ions towards the membrane to grow nanotubes of said single isotope selectively doped with at least one dopant isotope from said second subset.

14. The apparatus of claim 8, wherein said selection filter is reconfigured to direct a different subset including a different single isotope from the first selected element towards the membrane to grow an isotope-junction between the different single isotopes from the first selected element.

15. The apparatus of claim 8, wherein said selection filter is reconfigured to direct a different subset including a different single isotope from a second selected element towards the membrane to grow an isotope-junction between the different single isotopes from the first and second selected elements.

16. The apparatus of claim 8, further comprising:
a second ion source configured to generate ions from one or more elements, said ions including a plurality of different isotopes or unique molecular combinations of two or more different isotopes from at least one of selected elements; and
a second selection filter configured to direct a different subset of the ions from said second ion source simultaneously towards the membrane resulting in ion implantation through the first portion of catalyst surface into the catalyst, and growth from the opposing second portion of catalyst surface of nanotubes composed of at least one isotope in the subset from a first selected element and at least one isotope in the different subset from a second selected element.

17. The apparatus of claim 1, further comprising:
a controller that configures the selection filter to direct different subsets of ions towards the membrane to grow nanotubes whose isotope composition varies over the length of the nanotube.

18. The apparatus of claim 1, wherein the selection filter directs ions of a certain mass number towards the substrate.

19. The apparatus of claim 18, wherein the selection filter comprises:
an electromagnet;
a source that provides electric current to the electromagnet to establish an electric field that separates the ions according to their different mass-to-charge ratio; and
a controller that sets the electric current so that the ions in the subset are directed towards the membrane.

20. The apparatus of claim 18, wherein the selection filter comprises:
an electromagnet;
a source that provides electric current to the electromagnet to establish an electric field that separates the ions according to their different mass-to-charge ratio;
an electro static bouncer chamber,
a source that applies a voltage to the electrostatic bouncer chamber to establish an electric field that changes the energy of the ions; and
a controller that sets the voltage applied to the electrostatic bouncer chamber so that ions in different subsets are directed towards the membrane sequentially.

21. An apparatus for growing nanotubes from one or more specific isotopes of one or more elements selected from among Carbon, Nitrogen, Boron, Titanium, Silicon, Germanium, Aluminum and Gallium, comprising:
a chamber;
a membrane that separates the chamber into an implantation region and a growth region;
one or more catalysts supported by the membrane, said catalyst having a first portion of catalyst surface facing the implantation region and an opposing second portion of catalyst surface directly exposed to the growth region;
an ion source configured to generate ions from one or more elements, said ions including a plurality of different isotopes from one element; and
a selection filter configured to direct ions having a certain mass number corresponding to one said isotope towards the membrane resulting in ion implantation through the first portion of catalyst surface into the catalyst, and growth from the opposing second portion of catalyst surface of nanotubes composed of said one isotope.

22. The apparatus of claim 21, wherein the nanotube is comprised of at least 99.9% percent by number of atoms of said one isotope.

23. The apparatus of claim 22, wherein said ion source generates carbon ions including at least 12C and 13C and said selection filter directs ions having a mass number of one of twelve and thirteen towards the substrate to grow carbon nanotubes of only said 12C or only said 13C isotope with a purity of at least 99.9%.

24. The apparatus of claim 21, wherein said ions also include one said unique molecular combination having a mass number equal to the certain mass number, said molecular combination directed towards the membrane simultaneously with said one isotope of the same certain mass number to grow nanotubes further composed of at least one said isotope in the molecular combination.

25. An apparatus for growing nanotubes from one or more specific isotopes of one or more elements selected from among Carbon, Nitrogen, Boron, Titanium, Silicon, Germanium, Aluminum and Gallium, comprising:
a chamber;
a membrane that separates the chamber into an implantation region and a growth region;
one or more catalysts supported by the membrane, said catalyst having a first portion of catalyst surface facing the implantation region and an opposing second portion of catalyst surface directly exposed to the growth region;
an ion source configured to generate ions from one or more elements, said ions including a plurality of different isotopes from one element; and
a selection filter configurable to direct ions having a mass number corresponding to one said isotope towards the membrane; and
a controller that configures the filter to direct ions having a first mass number corresponding to a first one of said isotopes and then configures the filter to direct ions having a second mass number corresponding to a second one of said isotopes sequentially towards the member resulting in ion implantation through the first portion of catalyst surface into the catalyst, and growth from the opposing second portion of catalyst surface of nanotubes composed of said first and then said second isotopes to form an isotope junction.

26. The apparatus of claim 25, wherein said ion source generates carbon ions including at least 12C and 13C, said controller configures the filter to direct ions having a first mass number of twelve and then configures the filter to direct ions having a second mass number of thirteen towards the membrane to form a 12C-13C isotope junction.

27. The apparatus of claim 26, where said ion source generates 11B1H ions that are directed with said 12C ions towards the substrate to form 12C-13 isotope junctions in which the 12C portion is uniformly doped with 11B.

28. An apparatus for growing nanotubes from one or more specific isotopes of one or more elements, comprising:
a chamber;
a membrane that separates the chamber into an implantation region and a growth region;
one or more catalysts supported by the membrane, said catalyst having a first portion of catalyst surface facing the implantation region and an opposing second portion of catalyst surface directly exposed to the growth region;

an ion source in said implantation region configured to generate ions from one or more elements, said ions including a plurality of different isotopes or unique molecular combinations of two or more different isotopes from at least one of the selected elements; and a selection filter in said implantation region configured to direct a subset of the ions having a first mass number corresponding to one said isotope or one said unique molecular combination towards the substrate resulting in ion implantation through the first portion of catalyst surface into the catalyst, and growth from the opposing second portion of catalyst surface in said growth regions of nanotubes composed of at least one said isotope or at least one isotope from the one said unique molecular combination in the subset.

29. The apparatus of claim 28, further comprising:

a controller that configures the selection filter to direct different subsets of ions towards the membrane to grow nanotubes whose isotope composition varies over the length of the nanotube.

* * * * *